United States Patent
Nakabayashi et al.

(10) Patent No.: US 7,980,142 B2
(45) Date of Patent: Jul. 19, 2011

(54) ULTRASONIC FLOW RATE MEASURING DEVICE HAVING A PLURALITY OF ULTRASONIC FLOW RATE SENSORS

(75) Inventors: Yuji Nakabayashi, Nara (JP); Akihisa Adachi, Nara (JP); Masato Satou, Nara (JP)

(73) Assignee: Panasonic Corporation, Osaka (JP)

( * ) Notice: Subject to any disclaimer, the term of this patent is extended or adjusted under 35 U.S.C. 154(b) by 120 days.

(21) Appl. No.: 12/513,563

(22) PCT Filed: Nov. 8, 2007

(86) PCT No.: PCT/JP2007/071726
§ 371 (c)(1),
(2), (4) Date: May 5, 2009

(87) PCT Pub. No.: WO2008/056745
PCT Pub. Date: May 15, 2008

(65) Prior Publication Data
US 2010/0064821 A1    Mar. 18, 2010

(30) Foreign Application Priority Data
Nov. 8, 2006   (JP) .................................. 2006-303201

(51) Int. Cl.
*G01F 1/84* (2006.01)
(52) U.S. Cl. .................................................. 73/861.27
(58) Field of Classification Search .................... None
See application file for complete search history.

(56) References Cited

U.S. PATENT DOCUMENTS

| | | | |
|---|---|---|---|
| 4,102,186 A | * | 7/1978 | Brown ....................... 73/861.27 |
| 4,545,244 A | * | 10/1985 | Yasuda et al. ................... 73/195 |
| 4,596,133 A | * | 6/1986 | Smalling et al. ............. 73/24.01 |
| 5,437,194 A | | 8/1995 | Lynnworth |
| 7,237,441 B2 | | 7/2007 | Umekage et al. |
| 7,360,449 B2 | | 4/2008 | Umekage et al. |
| 2010/0005902 A1 | * | 1/2010 | Iwanaga et al. ............. 73/861.27 |

FOREIGN PATENT DOCUMENTS

| | | |
|---|---|---|
| EP | 1612520 A1 | 1/2006 |
| JP | 62-009224 A | 1/1987 |

(Continued)

OTHER PUBLICATIONS

European Search Report for European Application No. 07831457.2, dated Oct. 16, 2009, 8 pages.

(Continued)

*Primary Examiner* — Harshad Patel
(74) *Attorney, Agent, or Firm* — Brinks Hofer Gilson & Lione

(57) ABSTRACT

The present invention is directed to an ultrasonic flow rate measuring device capable of improving the measurement accuracy. Such an ultrasonic flow rate measuring device comprises first to third ultrasonic flow rate sensors in the measurement passage which are equipped with first ultrasonic wave transmitter-receivers and second ultrasonic wave transmitter-receivers. First to third ultrasonic wave propagation paths connecting the first ultrasonic wave transmitter-receiver and the second ultrasonic wave transmitter-receivers, respectively, intersect at different angles with the flow direction of fluid flowing through the measurement passages. The ultrasonic flow rate measuring device of the present invention obtains a flow rate measurement selectively from one of the first to third ultrasonic flow rate sensors in response to a flow rate Q.

4 Claims, 8 Drawing Sheets

FOREIGN PATENT DOCUMENTS

| | | |
|---|---|---|
| JP | 2001-208585 A | 8/2001 |
| JP | 2002-257607 A | 9/2002 |
| JP | 2002-267513 A | 9/2002 |
| JP | 2002-372445 A | 12/2002 |
| JP | 2004-251700 * | 9/2004 |
| JP | 2004-257744 A | 9/2004 |

OTHER PUBLICATIONS

International Search Report issued Jan. 29, 2008 in International application No. PCT/JP2007/071726, 2 pages.

* cited by examiner

ULTRASONIC FLOW RATE MEASURING DEVICE HAVING A PLURALITY OF ULTRASONIC FLOW RATE SENSORS

TECHNICAL FIELD

The present invention relates to an ultrasonic flow rate measuring device which is constructed such that a first ultrasonic transmitter-receiver and a second ultrasonic transmitter-receiver of an ultrasonic flow rate sensor are provided to a measurement passage so as to measure a flow rate of a fluid flowing through the measurement passage by the ultrasonic flow rate sensor.

BACKGROUND ART

The ultrasonic flow rate measuring device is a device that measures a propagation time of an ultrasonic wave which is caused to propagate across a measurement passage while flowing a fluid through the measurement passage, and detects a flow rate of the fluid based on the measured information.

An ultrasonic wave transmitter and an ultrasonic wave receiver are provided respectively to the opposing short sides of the measurement passage, whose cross-section is rectangular.

The ultrasonic wave transmitter and the ultrasonic wave receiver face each other and transmit/receive an ultrasonic wave between them along a line, which intersects with the flow direction of the measurement passage at a predetermined angle.

Also, an ultrasonic flow rate measuring device has been proposed in which the measurement passage is constructed of multi-layered passages formed by partitioning the measurement passage with a plurality of parallelly arranged partitioning plates in order to improve the measurement accuracy.

Yet, another ultrasonic flow rate measuring device has been proposed in which a plurality of ultrasonic flow rate sensors (a first ultrasonic wave transmitter-receiver and a second ultrasonic wave transmitter-receiver) are arranged in the measurement passage to acquire a plurality of flow rate measurements, an average of which is calculated to determine a conclusive flow rate measurement (Patent Literature 1).

In Patent Literature 1, respective ultrasonic flow rate sensors are arranged to create ultrasonic wave propagation paths at different angles.

Patent Literature 1: JP-A-2002-257607

DISCLOSURE OF THE INVENTION

Problems that the Invention is to Solve

In the above technology in Patent Literature 1, however, one of the measurements from three ultrasonic flow rate sensors is highly accurate but is averaged with two measurements with low accuracy to output a conclusive flow rate measurement, which is after all of low accuracy.

The present invention has been made to solve the above problem, and it is an object of the present invention to provide an ultrasonic flow rate measuring device which outputs a flow rate measurement with an improved accuracy.

Means for Solving the Problems

An ultrasonic flow rate measuring device of the present invention comprises a measurement passage having a rectangular cross-section and a first ultrasonic flow rate sensor and a second ultrasonic flow rate sensor provided in the measurement passage. The first ultrasonic flow rate sensor and the second ultrasonic flow rate sensor each have a first ultrasonic wave transmitter-receiver and a second ultrasonic wave transmitter-receiver provided in the measurement passage. A first ultrasonic propagation path and a second ultrasonic wave propagation path respectively connecting pairs of the first ultrasonic wave transmitter-receiver and the second ultrasonic wave transmitter-receiver respectively intersect at different angles with a flow direction of the fluid flowing through the measurement passage. Flow rage measurements from the first ultrasonic flow rate sensor and the second ultrasonic flow rate sensor are selectively adopted according to the flow rate of the fluid.

The first ultrasonic wave propagation path of the first ultrasonic flow rate sensor and the second ultrasonic wave propagation path of the second ultrasonic flow rate sensor intersect at different angles with the flow direction of the fluid flowing through the measurement passage. Flow rate measurements from the first ultrasonic flow rate sensor and the second ultrasonic flow rate sensor are selectively adopted according to the flow rate.

As a result, the optimum flow rate measurement can be obtained according to the flow rate of the fluid, and thus a highly accurate measurement can be obtained.

Also, in the present invention, a flow rate measurement which more accurately reflects the actual flow rate is chosen from measurements of the first ultrasonic flow rate sensor and the second ultrasonic flow rate sensor.

Since a flow rate measurement which more accurately reflects the actual flow rate is chosen from measurements of the first ultrasonic flow rate sensor and the second ultrasonic flow rate sensor, a highly accurate flow rage measurement can be obtained.

Also, in the present invention, the measurement passage is divided into a plurality of layered flat passages with a plurality of partitioning plates arranged in the measurement passage substantially in parallel with respective ultrasonic wave propagation paths. The first ultrasonic flow rate sensor and the second ultrasonic flow rate sensor are segregated by the partitioning plates.

By segregating the first ultrasonic flow rate sensor and the second ultrasonic flow rate sensor with the partitioning plates, a higher measuring accuracy can be attained.

Also, in the present invention, the first ultrasonic flow rate sensor and the second ultrasonic flow rate sensor are arranged such that a propagation path center of the first ultrasonic wave propagation path and a propagation path center of the second ultrasonic wave propagation path coincide with each other when viewed along the thickness direction of the partitioning plates.

Since the propagation path center of the first ultrasonic wave propagation path and the propagation path center of the second ultrasonic wave propagation path coincide with each other, when viewed along the thickness direction of the partition plates, the first ultrasonic flow rate sensor and the second ultrasonic flow rate sensor can be arranged in proximity to each other.

As a result, the first ultrasonic flow rate sensor and the second ultrasonic flow rate sensor can be arranged in a relatively small space, thereby achieving a space saving.

Advantages of the Invention

According to the ultrasonic flow rate measuring device of the present invention, by choosing a ultrasonic wave propagation path appropriate for the flow rate of the fluid, the optimum flow rate measurement can be obtained according to the flow rate of the fluid and thus the measurement accuracy can be improved.

DETAILED DESCRIPTION OF THE PREFERRED EMBODIMENTS

Respective ultrasonic flow rate measuring devices according to the embodiments of the present invention will be explained with reference to the attached drawings hereinafter.

First Embodiment

Figure 1:
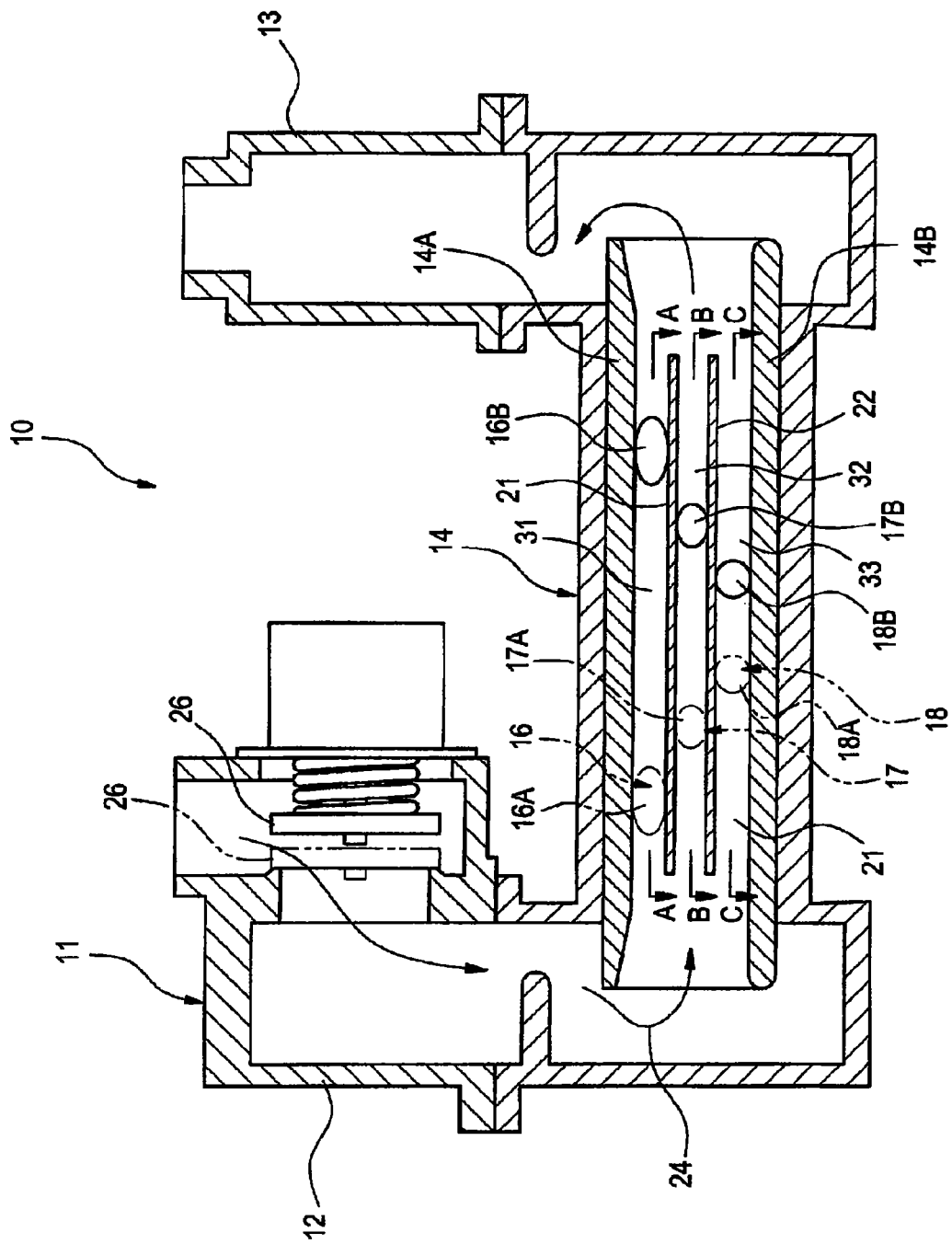
FIG. 1 is a cross-sectional view showing an ultrasonic flow rate measuring device (first embodiment) according to the present invention.
Figure 2:
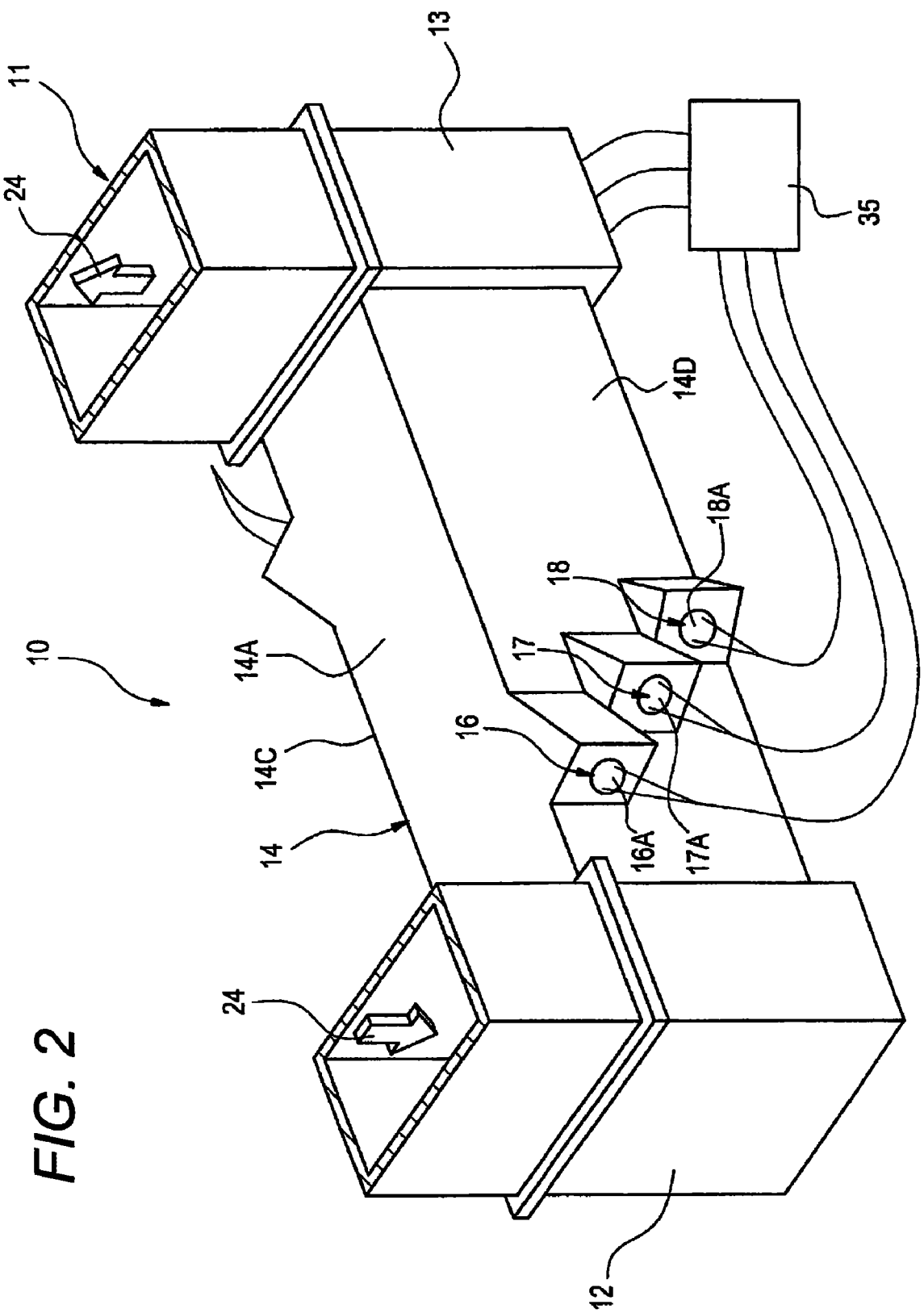
FIG. 2 is a perspective view showing the ultrasonic flow rate measuring device according to the first embodiment.

As shown in FIG. 1, FIG. 2, and FIG. 3, an ultrasonic flow rate measuring device 10 according to the first embodiment of the present invention includes: a fluid channel 11 of a generally U-shape made of left and right vertical channels 12, 13 and a measurement passage 14; a first ultrasonic flow rate sensor 16, a second ultrasonic flow rate sensor 17, and a third ultrasonic flow rate sensor 18 provided in the measurement passage 14; and a plurality of partitioning plates provided in the measurement passage 14 which include a first partitioning plate 21 and a second partitioning plate 22. One of the measurements from the first ultrasonic flow rate sensor 16, the second ultrasonic flow rate sensor 17, and the third ultrasonic flow rate sensor 18 will be taken, according to a flow rate Q of fluid 24.

The fluid channel 11 has a cutoff valve 26 in the left vertical channel 12. The first partitioning plate 21 and the second partitioning plate 22 are provided at regular intervals in the measurement passage 14 along upper and lower walls 14A, 14B.

The measurement passage 14 is rectangular in cross-section, which is delineated by the upper and lower walls 14A, 14B and left and right side walls 14C, 14D. Also, with the first partitioning plate 21 and the second partitioning plate 22 provided at regular intervals in parallel with the upper and lower walls 14A, 14B, a plurality of flat passages are formed in the measurement passage 14, which include a first flat passage 31, a second flat passage 32, and a third flat passage 33.

The first flat passage 31, the second flat passage 32, and the third flat passage 33 are each formed to have a cross-section which is substantially rectangular.

In the fluid channel 11, when the cutoff valve 26 is operated to move from a closed position shown by dash lines to an open position shown in solid lines, fluid (for example, natural gas or liquefied petroleum gas) 24 flows from the left vertical channel 12 to the right vertical channel 13 through the measurement passage 14.

Figure 3A:
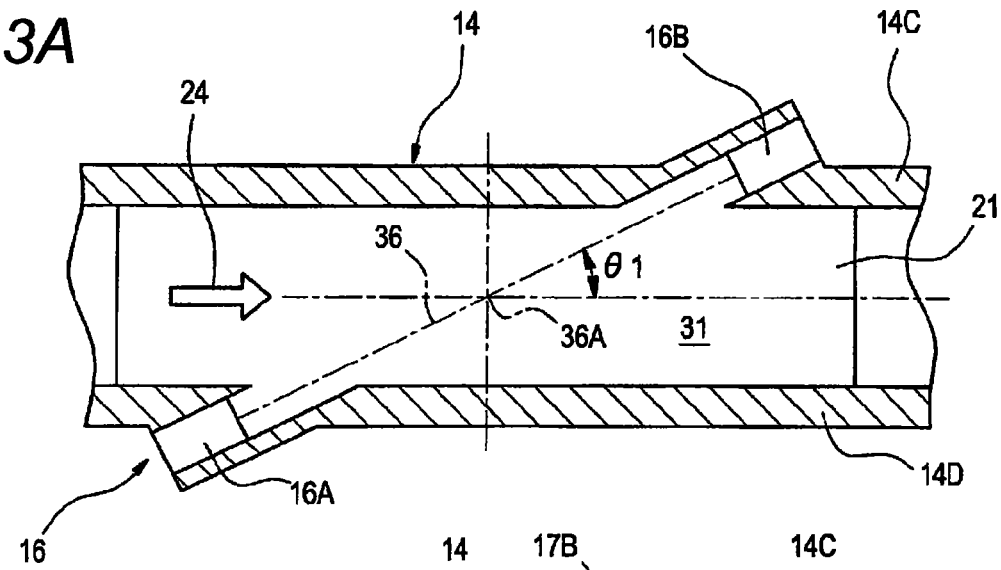
FIG. 3A is a cross-sectional view taken along the A-A line in FIG. 1.

As shown in FIG. 3A, the first ultrasonic flow rate sensor 16 is provided in the first flat passage 31. Specifically, the first ultrasonic flow rate sensor 16 has a first ultrasonic wave transmitter-receiver 16A provided in the right side wall 14D, and a second ultrasonic wave transmitter-receiver 16B provided in the left side wall 14C. The first ultrasonic wave transmitter-receiver 16A is arranged upstream of the second ultrasonic wave transmitter-receiver 16B.

The first ultrasonic flow rate sensor 16, i.e., the first ultrasonic wave transmitter-receiver 16A and the second ultrasonic wave transmitter-receiver 16B, is connected to a calculating module 35.

A first ultrasonic wave propagation path 36 connecting the first ultrasonic wave transmitter-receiver 16A and the second ultrasonic wave transmitter-receiver 16B constitutes a Z-path parallel with the first partitioning plate 21 and intersecting at an angle θ1 with the flow direction (indicated by an arrow) of the fluid 24 flowing through the measurement passage 14.

While the fluid 24 is flowing through the measurement passage 14, an ultrasonic wave is propagated from the first ultrasonic wave transmitter-receiver 16A to the second ultrasonic wave transmitter-receiver 16B and also another ultrasonic wave is propagated from the second ultrasonic wave transmitter-receiver 16B to the first ultrasonic wave transmitter-receiver 16A. Then, propagation times of the ultrasonic waves are measured by the calculating module 35, and a flow speed of the fluid is derived based on the calculation result.

Figure 3B:
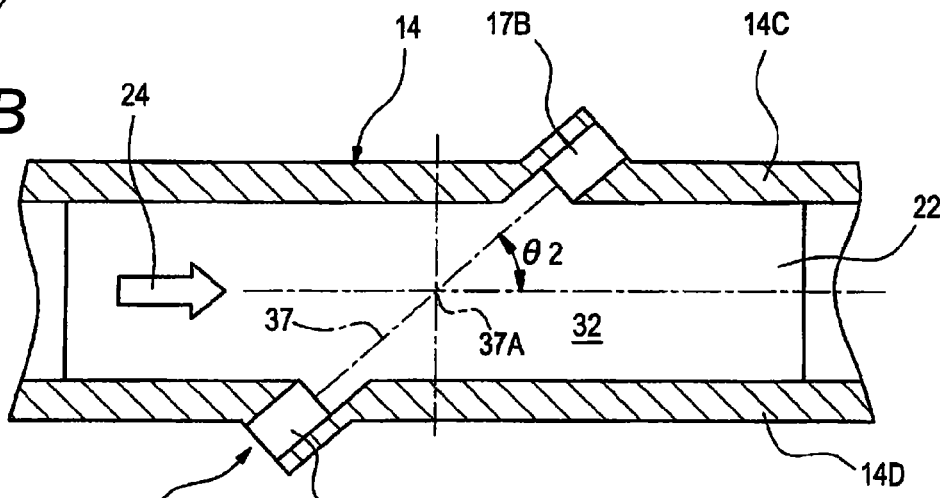
FIG. 3B is a cross-sectional view taken along the B-B line in FIG. 1.

As shown in FIG. 3B, the second ultrasonic flow rate sensor 17 is provided in the second flat passage 32. Specifically, the second ultrasonic flow rate sensor 17 has a first ultrasonic wave transmitter-receiver 17A provided in the right side wall 14D, and a second ultrasonic wave transmitter-receiver 17B provided in the left side wall 14C. The first ultrasonic wave transmitter-receiver 17A is arranged upstream of the second ultrasonic wave transmitter-receiver 17B.

The second ultrasonic flow rate sensor 17, i.e., the first ultrasonic wave transmitter-receiver 17A and the second ultrasonic wave transmitter-receiver 17B, is connected to the calculating module 35.

A second ultrasonic wave propagation path 37 connecting the first ultrasonic wave transmitter-receiver 17A and the second ultrasonic wave transmitter-receiver 17B constitutes a Z-path parallel with the first and second partitioning plates 21, 22 and intersecting at an angle θ2 with the flow direction (indicated by an arrow) of the fluid 24 flowing through the measurement passage 14.

While the fluid 24 is flowing through the measurement passage 14, an ultrasonic wave is propagated from the first ultrasonic wave transmitter-receiver 17A to the second ultrasonic wave transmitter-receiver 17B, and another ultrasonic wave is propagated from the second ultrasonic wave transmitter-receiver 17B to the first ultrasonic wave transmitter-receiver 17A. Then, propagation times of the ultrasonic waves are measured by the calculating module 35, and a flow speed of the fluid is derived based on calculation result.

Figure 3C:
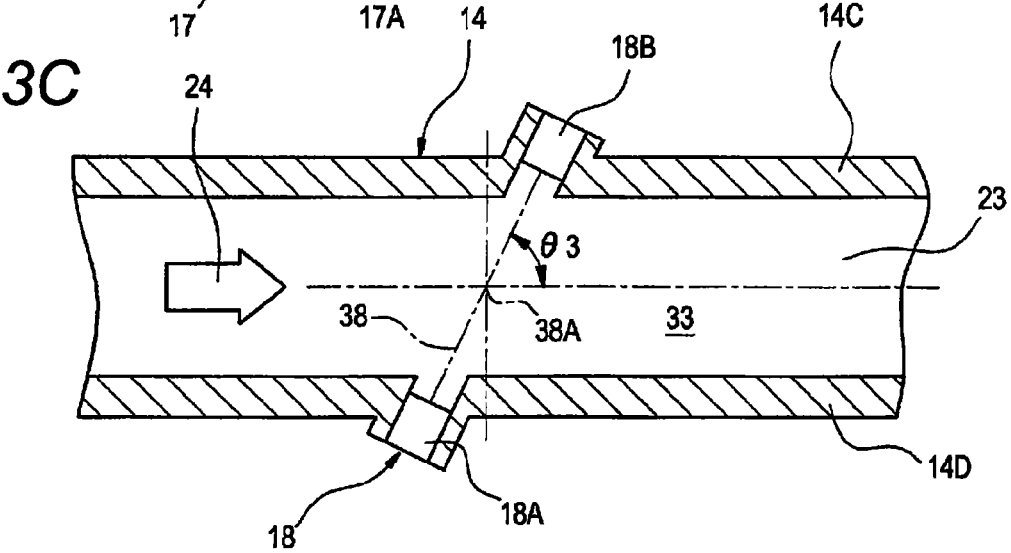
FIG. 3C is a cross-sectional view taken along the C-C line in FIG. 1.

As shown in FIG. 3C, the third ultrasonic flow rate sensor 18 is provided in the third flat passage 33. Specifically, the third ultrasonic flow rate sensor 18 has a first ultrasonic wave transmitter-receiver 18A provided in the right side wall 14D, and a second ultrasonic wave transmitter-receiver 18B provided in the left side wall 14C. The first ultrasonic wave transmitter-receiver 18A is arranged upstream of the second ultrasonic wave transmitter-receiver 18B.

The third ultrasonic flow rate sensor 18, i.e., the first ultrasonic wave transmitter-receiver 18A and the second ultrasonic wave transmitter-receiver 18B, is connected to the calculating module 35.

A third ultrasonic wave propagation path 38 connecting the first ultrasonic wave transmitter-receiver 18A and the second ultrasonic wave transmitter-receiver 18B constitutes a Z-path parallel with the second partitioning plate 22 and intersecting at an angle θ3 with the flow direction (indicated by an arrow) of the fluid 24 flowing through the measurement passage 14.

While the fluid 24 is flowing through the measurement passage 14, an ultrasonic wave is propagated from the first ultrasonic wave transmitter-receiver 18A to the second ultrasonic wave transmitter-receiver 18B and also another ultrasonic wave is propagated from the second ultrasonic wave transmitter-receiver 18B to the first ultrasonic wave transmitter-receiver 18A. Then, propagation times of the ultrasonic waves are measured by the calculating module 35, and a flow speed of the fluid is derived based on the calculation result.

Here, the first ultrasonic flow rate sensor 16 and the second ultrasonic flow rate sensor 17 are separated from each other by the first partitioning plate 21. Also, the second ultrasonic flow rate sensor 17 and the third ultrasonic flow rate sensor 18 are separated from each other by the second partitioning plate 22.

Because the first ultrasonic flow rate sensor 16, the second ultrasonic flow rate sensor 17, and the third ultrasonic flow rate sensor 18 are separated from each other by the first partitioning plate 21 and the second partition plate 22, a higher measurement accuracy can be achieved.

A relationship of θ1<θ2<θ3 stands among the angle θ1 of the first ultrasonic wave propagation path 36, the angle θ2 of the second ultrasonic propagation path 37, and the angle θ3 of the third ultrasonic wave propagation path 38.

The angles θ1, θ2, θ3 fall within a range of 0 to 90° respectively. The angle θ1 is set towards an angle of 0°, the angle θ2 is set in the middle, and the angle θ3 is set towards an angle of 90°.

That is, the first ultrasonic wave propagation path 36, the second ultrasonic wave propagation path 37, and the third ultrasonic wave propagation path 38 are set to intersect at different angles of θ1, θ2, θ3 with respect to the flow direction of the fluid 24 flowing through the measurement passage 14.

Also, the first ultrasonic wave propagation path 36, the second ultrasonic wave propagation path 37, and the third ultrasonic wave propagation path 38 are arranged such that the first, second and third ultrasonic wave propagation paths 36, 37 and 38 have a propagation path center 36A, a propagation path center 17A, and a propagation path center 38A, respectively, which coincide with each other when viewed in the thickness direction of the first partitioning plate 21 and the second partitioning plate 22.

Therefore, the first ultrasonic flow rate sensor 16, the second ultrasonic flow rate sensor 17, and the third ultrasonic flow rate sensor 18 can be arranged in proximity to each other.

As a result, the first ultrasonic flow rate sensor 16, the second ultrasonic flow rate sensor 17, and the third ultrasonic flow rate sensor 18 can be arranged within a relatively small space, and thus a space saving can be achieved.

Figure 4:
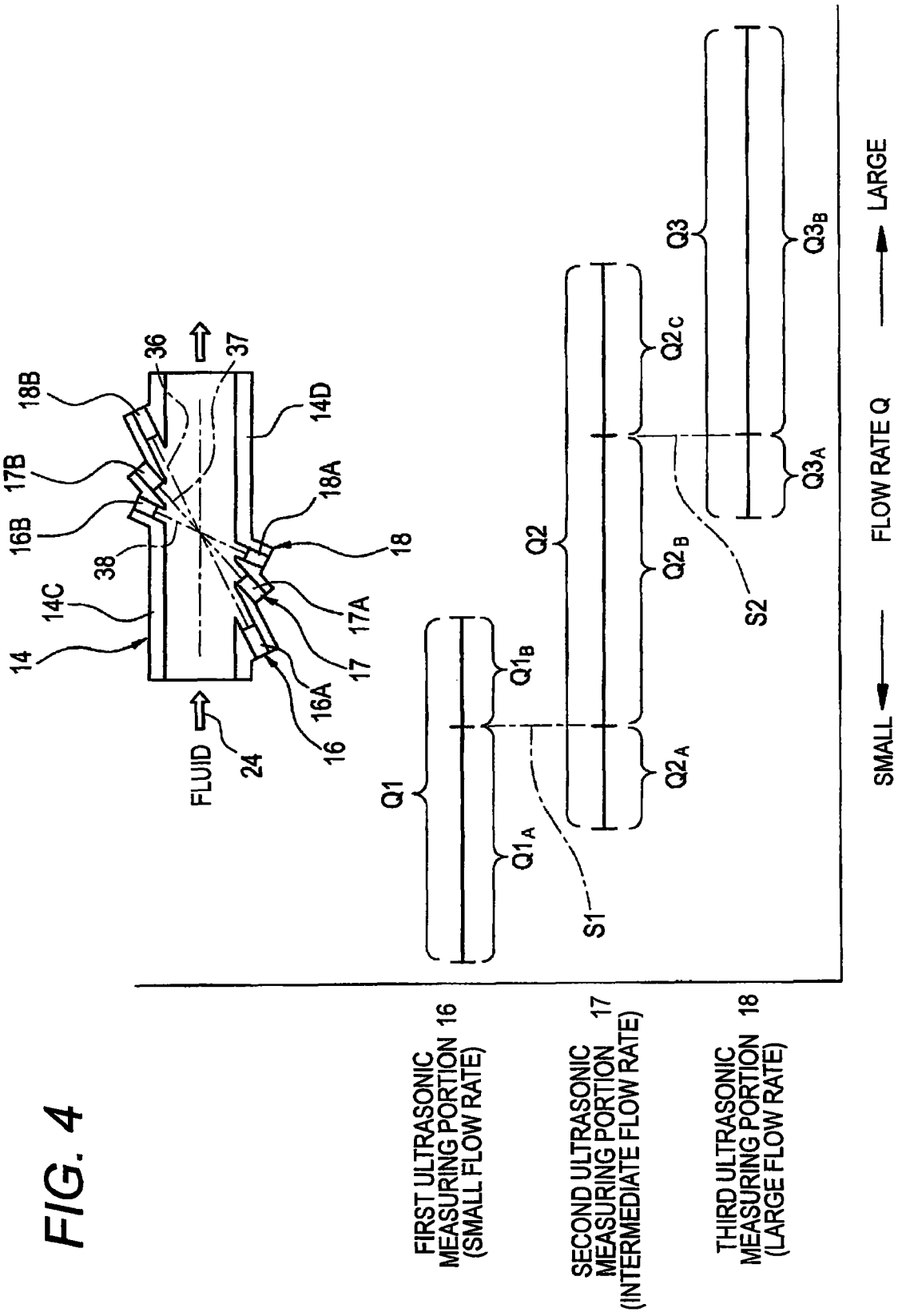
FIG. 4 is a view explaining the characteristics of first to third ultrasonic flow rate sensors according to the first embodiment.

Next, the reason why the first ultrasonic flow rate sensor 16, the second ultrasonic flow rate sensor 17, and the third ultrasonic flow rate sensor 18 are provided in the ultrasonic flow rate measuring device 10 will be explained with reference to FIG. 4 hereunder.

The first ultrasonic flow rate sensor 16 has the first ultrasonic wave propagation path 36 inclined at the angle θ1 towards the angle 0°.

When the fluid 24 flows through the measurement passage 14 at small flow rates of Q1, the first ultrasonic flow rate sensor 16 is preferably used to measure a flow rate of the fluid 24.

Specifically, the first ultrasonic flow rate sensor 16 can accurately measure a flow speed of the fluid 24 which falls within small flow rates $Q1_A$ of the flow rates Q1, and can fairly accurately measure a flow speed of the fluid 24 which falls within flow rates $Q1_B$.

The flow rates $Q1_A$ and the flow rates $Q1_B$ are discriminated with a threshold value S1.

The second ultrasonic flow rate sensor 17 has the second ultrasonic propagation path 37 inclined towards the middle at the angle θ2.

When the fluid 24 flows through the measurement passage 14 at intermediate flow rates Q2, the second ultrasonic flow rate sensor 17 is preferably used to measure a flow speed of the fluid 24.

Specifically, the second ultrasonic flow rate sensor 17 can fairly accurately measure a flow rate of the fluid 24 which falls within flow rates $Q2_A$ of the intermediate flow rates Q2, can accurately measure a flow rate of the fluid 24 which falls within flow rates $Q2_B$, and can fairly accurately measure a flow rate of the fluid 24 which falls within flow rates $Q2_C$.

The flow rates $Q2_A$ and the flow rates $Q2_B$ are discriminated with the threshold value S1, and the flow rates $Q2_B$ and the flow rates $Q2_C$ are discriminated with a threshold value S2.

The third ultrasonic flow rate sensor 18 has the third ultrasonic wave propagation path 38 inclined at the angle θ3 towards the angle 90°.

When the fluid 24 flows through the measurement passage 14 at large flow rates Q3, the third ultrasonic flow rate sensor 18 is preferably used to measure a flow rate of the fluid 24.

Specifically, the third ultrasonic flow rate sensor 18 can fairly accurately measure a flow rate of the fluid 24 which falls within flow rates $Q3_A$ of the large flow rates Q3, and can accurately measure a flow rate of the fluid 24 which falls within flow rates $Q3_B$.

The flow rates $Q3_A$ and the flow rates $Q3_B$ are discriminated with the threshold value S2.

The ultrasonic flow rate measuring device 10 is constructed switchable, when the flow rate of the fluid 24 flowing through the measurement passage 14 is below the threshold value S1, to measure a flow speed of the fluid 24 with the first ultrasonic flow rate sensor.

Also, the ultrasonic flow rate measuring device 10 is constructed switchable; when the flow rate of the fluid 24 flowing through the measurement passage 14 is higher than the threshold value S1 but below the threshold value S2, to measure a flow speed of the fluid 24 with the second ultrasonic flow rate sensor.

Also, the ultrasonic flow rate measuring device 10 is constructed switchable, when the flow rate of the fluid 24 flowing through the measurement passage 14 is more than the threshold value S2, to measure a flow speed of the fluid 24 with the third ultrasonic measuring portion.

Therefore, the ultrasonic flow rate measuring device 10 selects (switches) one among the first ultrasonic flow rate sensor 16, the second ultrasonic flow rate sensor 17, and the third ultrasonic flow rate sensor 18 which is preferable according to the flow rate Q of the fluid 24, and measures a flow speed of the fluid 24 with the selected ultrasonic flow rate sensor.

As a result, the ultrasonic flow rate measuring device 10 can accurately measure flow rates Q in the measurement passage 14 within a wide flow rate range including the small flow rates Q1, the intermediate flow rates Q2 and the large flow rates Q3.

There is a concern that if the threshold value S1 is simply used to switch between the first ultrasonic flow rate sensor 16 and the second ultrasonic flow rate sensor 17, and the threshold value S2 is simply used to switch between the second ultrasonic flow rate sensor 17 and the third ultrasonic flow rate sensor 18, switching would occur at a high frequency among the ultrasonic flow rate sensors 16 to 18 (causing a chattering) when the flow rates Q come in proximity to the threshold value S1 or S2.

The problem that the first ultrasonic flow rate sensors 16, 17 and 18 are switched frequently around the threshold values S1, S2. can be prevented from occurring by providing a hysteresis to the threshold values S1, S2

Next, an operation of the ultrasonic flow rate measuring device 10 of the first embodiment will be explained with reference to FIG. 4 hereunder.

A flow rate Q of the fluid 24 flowing through the measurement passage 14 is detected by a flow rate detector (not shown), and the detected information is transmitted to the calculating module 35.

The calculating module 35 determines whether the flow rate Q is lower than the threshold values S1 (i.e., Q<S1), equal to or higher than the threshold values S1 and lower than the threshold values S2 (S1≦Q<S2), or equal to or higher than the threshold values S2 (S2≦Q).

When the detected flow rate Q is Q<S1, a circuit is switched to measure the flow rate with the first ultrasonic flow rate sensor 16. The first ultrasonic flow rate sensor 16 can accurately measure a flow rate which falls within the small flow rates $Q1_A$ when Q<S1.

Therefore, the flow rate Q can be measured with a high accuracy by the first ultrasonic flow rate sensor 16, and thereby a highly accurate flow rate measurement can be obtained.

When the flow rate Q is increased to S1≦Q<S2, the circuit is switched to measure the flow rate with the second ultrasonic flow rate sensor 17. The second ultrasonic flow rate sensor 17 can accurately measure a flow speed which falls within the intermediate flow rates $Q2_B$ when S1≦Q<S2.

Therefore, the flow rate Q can be measured with a high accuracy by the second ultrasonic flow rate sensor 17, and thereby a highly accurate measurement can be obtained.

When the flow rate Q is further increased to S2≦Q, the circuit is switched to measure the flow rate with the third ultrasonic flow rate sensor 18. The third ultrasonic flow rate sensor 18 can accurately measure a flow rate which falls within the large flow rates $Q3_B$ when S2≦Q.

Therefore, the flow rate Q can be measured with a high accuracy by the third ultrasonic flow rate sensor 18, and thereby a highly accurate measurement can be obtained.

In the present embodiment, the first ultrasonic flow rate sensor 16, the second ultrasonic flow rate sensor 17, and the third ultrasonic flow rate sensor 18 are arranged in parallel with the first partitioning plate 21 and the second partitioning plate 22. But the present invention is not limited to this configuration. The first ultrasonic wave propagation path 36, the second ultrasonic wave propagation path 37, and the third ultrasonic wave propagation path 38 may be arranged along the first partitioning plate 21 and the second partitioning plate 22.

Next, ultrasonic flow rate measuring devices according to a second embodiment and a third embodiment will be explained with reference to FIG. 5 and FIG. 6 hereunder. Here, in the second embodiment and the third embodiment, similar members to those of the ultrasonic fluid measuring device 10 of the first embodiment will be referenced with the same numbers, and their explanation will be omitted herein.

Second Embodiment

Figure 5:
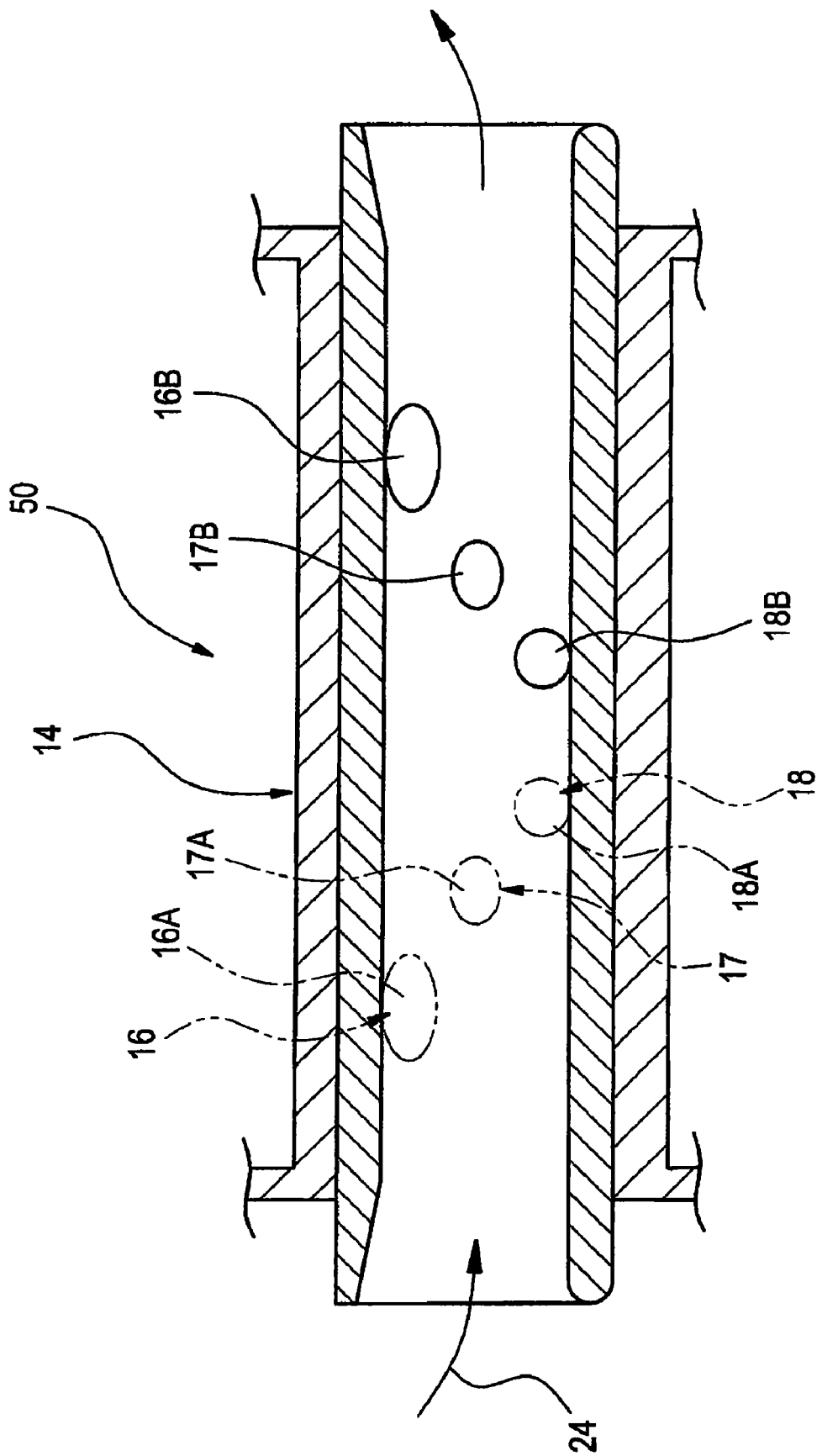
FIG. 5 is a cross-sectional view showing an ultrasonic flow rate measuring device (second embodiment) according to the present invention.

An ultrasonic flow rate measuring device 50 of the second embodiment shown in FIG. 5 differs in that the measurement passage 14 creates a single flow layer by removing the first partitioning plate 21 and the second partitioning plate 22 from the measurement passage 14 of the first embodiment. The remaining members are similar to those of the first embodiment.

The ultrasonic fluid measuring device 50 of the second embodiment has a simple configuration by dispensing with the first partitioning plate 21 and the second partitioning plate 22 from the measurement passage 14.

In addition, the ultrasonic flow rate measuring device 50 of the second embodiment achieves the same advantageous results as the ultrasonic flow rate measuring device 10 in the first embodiment.

Third Embodiment

Figure 6:
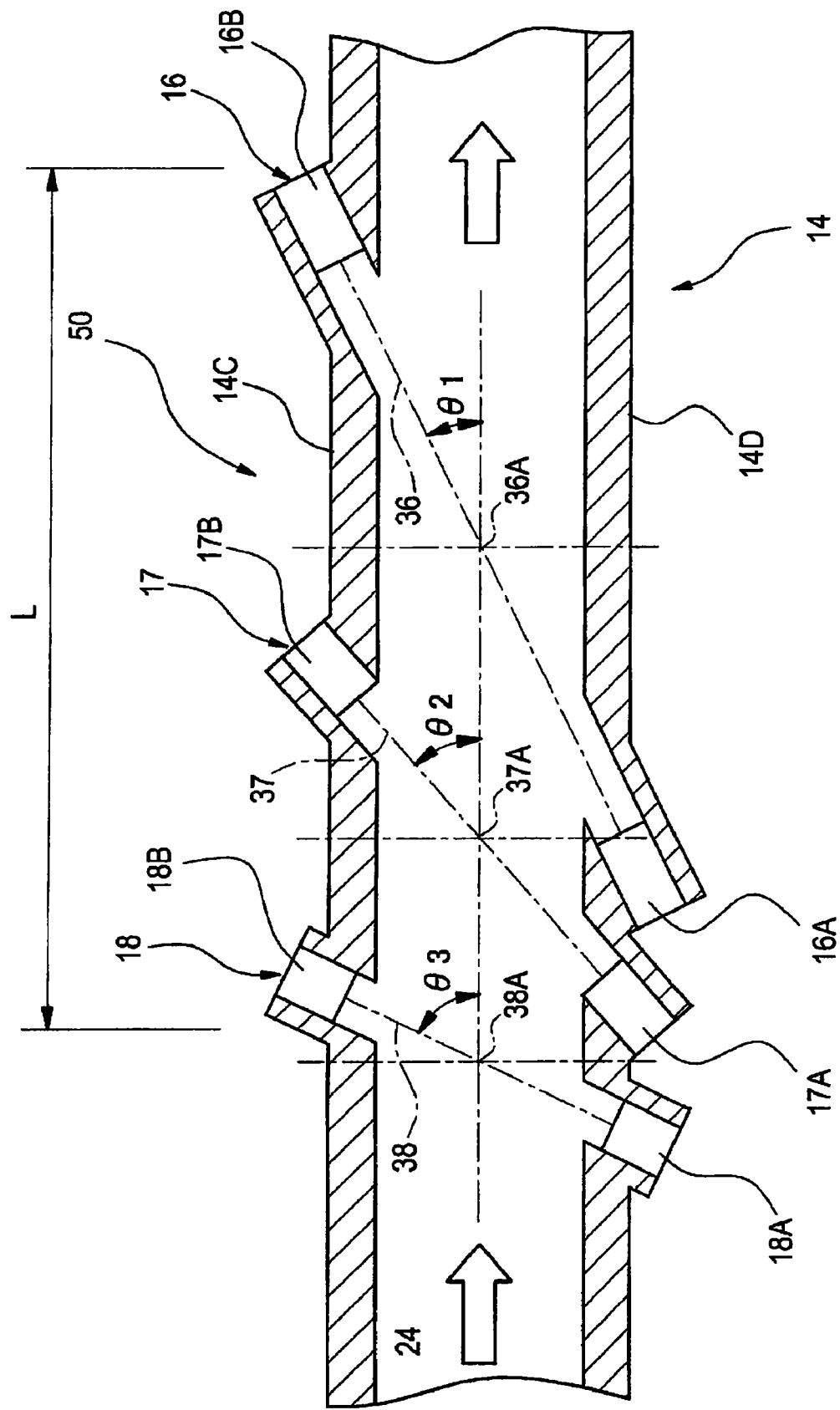
FIG. 6 is a cross-sectional view showing an ultrasonic flow rate measuring device (third embodiment) according to the present invention.

An ultrasonic flow rate measuring device 60 of the third embodiment shown in FIG. 6 differs in that the first ultrasonic flow rate sensor 16, the second ultrasonic flow rate sensor 17, and the third ultrasonic flow rate sensor 18 are arranged such that the propagation wave path centers 36A to 38A of the first ultrasonic wave propagation path 36, the second ultrasonic wave propagation path 37, and the third ultrasonic wave propagation path 38 do not coincide with each other when viewed in the thickness direction of the first partitioning plate 21 and the second partitioning plate 22. The remaining configurations are similar to those of the first embodiment.

According to the ultrasonic flow rate measuring device 60 of the third embodiment, since the ultrasonic wave propagation paths 36, 37 and 38 of the first, second and third ultrasonic flow rate sensors 16, 17 and 18 are not intersected with each other, a more space will be available to arrange the first ultrasonic flow rate sensor 16, the second ultrasonic flow rate sensor 17, and the third ultrasonic flow rate sensor 18, resulting in increasing freedom of designing the arrangement of the first ultrasonic flow rate sensor 16, the second ultrasonic flow rate sensor 17, and the third ultrasonic flow rate sensor 18.

In addition, the ultrasonic flow rate measuring device 60 of the third embodiment can achieve the same advantageous effects as the ultrasonic flow rate measuring device 10 of the first embodiment.

Although the above embodiments are explained in which the ultrasonic wave propagation path 19 between the first ultrasonic wave transmitter-receiver 17 and the second ultrasonic wave transmitter-receiver 18 is set in a Z-path, the present invention is not restricted to the configuration. The ultrasonic wave propagation path 19 may be in a V-path or a W-path.

Also, the shapes and the configurations of the measurement passage 14 as explained above are exemplary and not restricted to them, and may be changed appropriately.

Figure 7A:
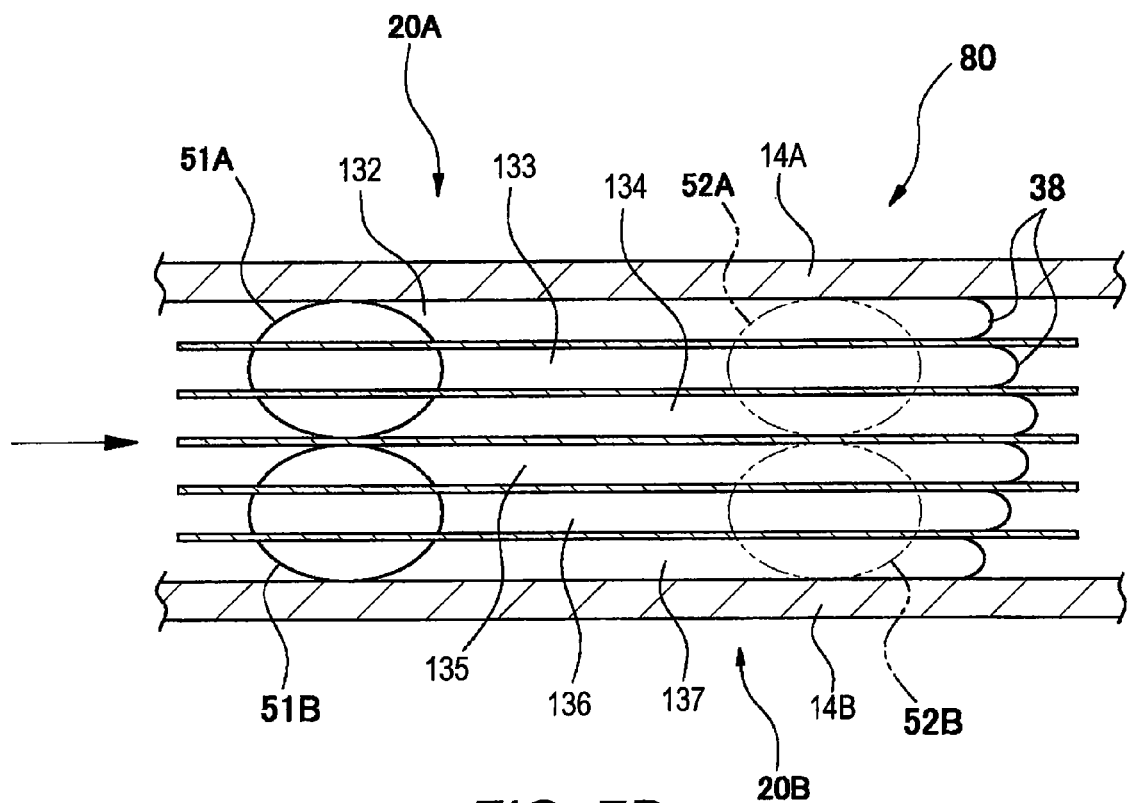
FIGS. 7A and 7B are an enlarged view and a major schematic perspective view, respectively, showing an ultrasonic flow rate sensor of an ultrasonic flow rate measuring device according to a fourth embodiment.
Figure 7B:
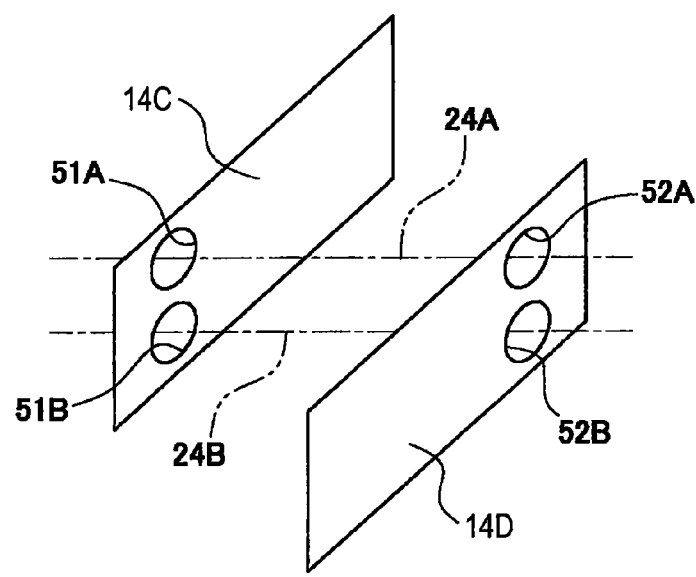
Figure 8A:
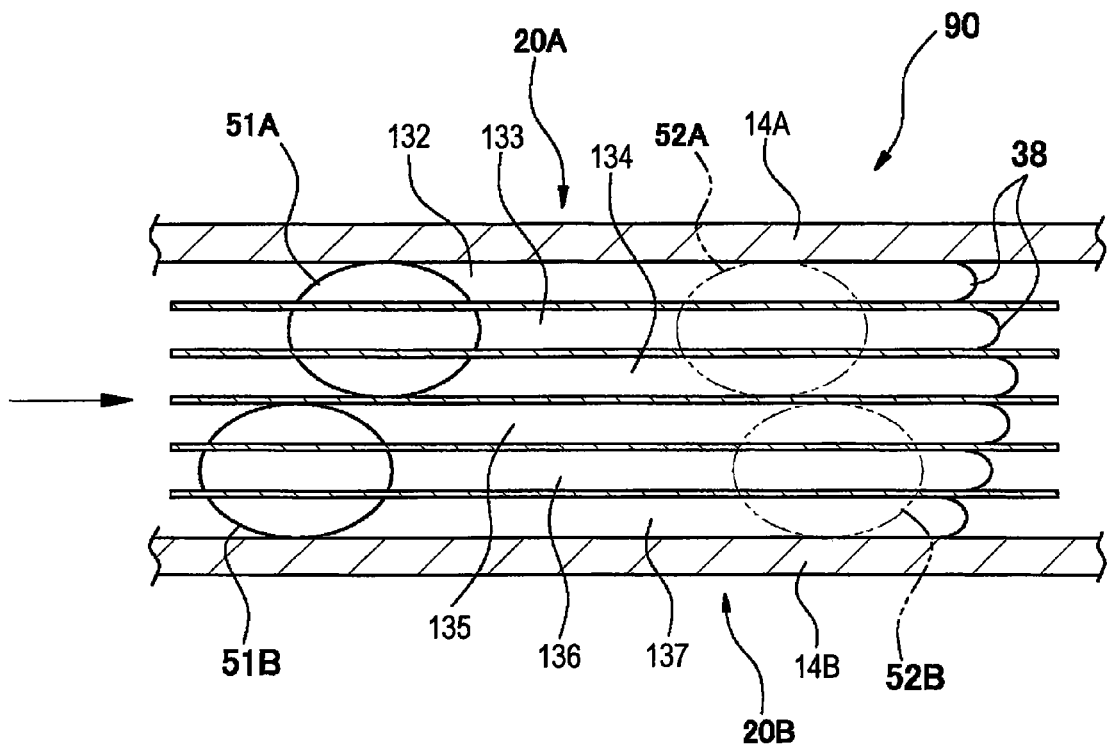
FIGS. 8A, 8B and 8C are an enlarged view, a major schematic perspective view, and a major schematic plan view, respectively, showing an ultrasonic flow rate sensor of an ultrasonic flow rate measuring device according to a fifth embodiment.
Figure 8B:
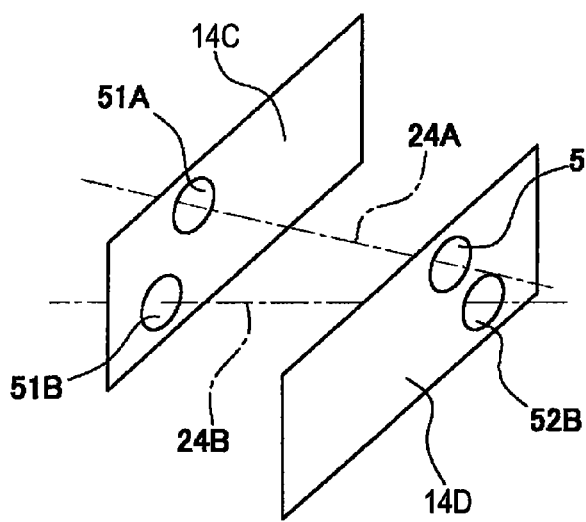
Figure 8C:
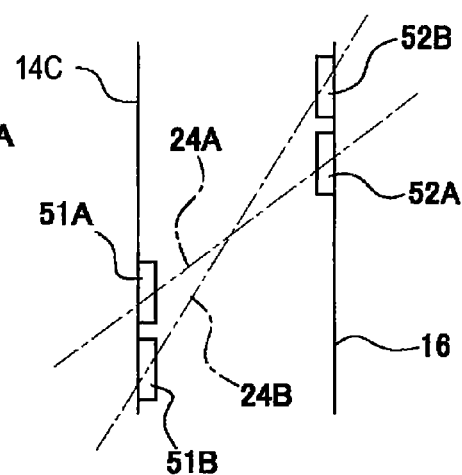

For example, a fourth embodiment shown in FIGS. 7A and 7B and a fifth embodiment shown in FIGS. 8A to 8C also fall within the scope of the present invention.

An ultrasonic flow rate measuring device 80 of the fourth embodiment shown in FIGS. 7A and 7B t has a first ultrasonic flow rate sensor 20A and a second ultrasonic flow rate sensor 20B. The first ultrasonic flow rate sensor 20A and the second ultrasonic flow rate sensor 20B are positioned above and below from a center 39 along the lamination direction (i.e., the vertical direction) of first to sixth flat passages 132 to 137 in the measurement passages 14 defined by the walls 14A, 14B, 14C and 14D.

Specifically, the first ultrasonic flow rate sensor 20A has a first ultrasonic wave transmitter-receiver 51A and a second ultrasonic wave transmitter-receiver 52A arranged across the neighboring first to third flat passages 132 to 134.

In contrast, the second ultrasonic flow rate sensor 20B has a first ultrasonic wave transmitter-receiver 51B and a second ultrasonic wave transmitter-receiver 52B arranged across the neighboring fourth to sixth flat passages 135 to 137.

Therefore, as shown in FIG. 7B, the ultrasonic flow rate measuring device 80 has an ultrasonic wave propagation path 24A between the first ultrasonic wave transmitter-receiver 51A and the second ultrasonic wave transmitter-receiver 52A runs in parallel with an ultrasonic wave propagation path 24B between the first ultrasonic wave transmitter-receiver 51B and the second ultrasonic wave transmitter-receiver 52B, when viewed along the lamination direction of the first to sixth flat passages 132 to 137.

According to such ultrasonic flow rate measuring device 80 measures all of the first to sixth flat passages 132 to 137 with the first ultrasonic flow rate sensor 20A and the second ultrasonic flow rate sensor 20B and thus can accurately measure a flow rate of the fluid 38.

Also, an operation is possible in which a flow rate of the fluid 38 is measured normally with one of the first ultrasonic flow rate sensor 20A and the second ultrasonic flow rate sensor 20B, whereas when a high-accuracy measurement is needed, a flow rate of the fluid 38 is measured with both of the first ultrasonic flow rate sensor 20A and the second ultrasonic flow rate sensor 20B.

An ultrasonic flow rate measuring device 90 of the fifth embodiment shown in FIGS. 8A to 8C is a variation of the fourth embodiment. The first ultrasonic wave transmitter-receiver 51A, the second ultrasonic wave transmitter-receiver 52A, the first ultrasonic wave transmitter-receiver 51B, and the second ultrasonic wave transmitter-receiver 52B are arranged (see FIGS. 8B, 8C) such that, when viewed along the lamination direction of the first to sixth flat passages 132 to 137, the ultrasonic wave propagation path 24A intersects with the ultrasonic wave propagation path 24B.

The ultrasonic flow rate measuring device 90, like the fourth embodiment, measures flow rates in all of the first to sixth flat passes 132 to 137 with the first ultrasonic flow rate sensor 20A and the second ultrasonic flow rate sensor 20B and thus can accurately measure a flow rate of the fluid 138.

Also, an operation is possible in which a flow rate of the fluid 38 is measured normally with one of the first ultrasonic flow rate sensor 20A and the second ultrasonic flow rate sensor 20B, whereas when a high-accuracy measurement is needed, a flow rate of the fluid 138 is measured with both of the first ultrasonic flow rate sensor 20A and the second ultrasonic flow rate sensor 20B.

Also, another operation is possible in which the first ultrasonic flow rate sensor 20A and the second ultrasonic flow rate sensor 20B are selectively used according to the flow rate of the fluid 38, thereby obtaining an optimum measurement in response to the flow rate of the fluid and thus improving the measuring accuracy.

This application is based upon Japanese Patent Application (Patent Application No. 2006-303201) filed on Nov. 8, 2006; the contents of which are incorporated herein by reference.

INDUSTRIAL APPLICABILITY

The present invention is directed to an ultrasonic flow rate measuring device that measures a flow rate of fluid such as natural gas, liquefied petroleum gas, air, water, and the like flowing through a measurement passage.

The invention claimed is:

1. An ultrasonic flow rate measuring device comprising:
a measurement passage through which a fluid flows, the measurement passage having a rectangular cross-section defined in part by a pair of opposing walls;
a plurality of pairs of ultrasonic flow rate sensors having ultrasonic wave propagation paths running across the measurement passage between the pair of opposing walls, wherein the plurality of pairs of ultrasonic flow rate sensors are arranged such that their ultrasonic wave propagation paths run respectively at different angles with respect to the flow direction of the measurement passage; and
layers of partitioning plates provided substantially in parallel to each other in the measurement passage so as to divide the measurement passage into layers of mutually parallel flat passages, wherein the ultrasonic wave propagation paths run respectively through different flat passages,
wherein the plurality of pairs of ultrasonic flow rate sensors are selectively used according to a flow rate to measure the flow rate of the fluid flowing in the measurement passage.

2. The ultrasonic flow rate measuring device according to claim 1, wherein the plurality of pairs of ultrasonic flow rate sensors are arranged such that the ultrasonic wave propagation paths have their centers each located on a line going perpendicular to the partitioning plates.

3. The ultrasonic flow rate measuring device according to claim 1, wherein the plurality of pairs of ultrasonic flow rate sensors are arranged such that the ultrasonic wave propagation paths each avoid running over a respective other propagation path.

4. The ultrasonic flow rate measuring device according to claim 1, wherein the ultrasonic wave propagation paths each constitute one of a Z path, a V path and a W path.

* * * * *